Oct. 14, 1969　　C. R. HURTIG ET AL　　3,473,121
SPECTRUM ANALYSIS USING SWEPT PARALLEL NARROW BAND FILTERS
Filed April 6, 1966

CARL R. HURTIG
AUSTEN MADESON
INVENTORS

United States Patent Office 3,473,121
Patented Oct. 14, 1969

3,473,121
SPECTRUM ANALYSIS USING SWEPT PARALLEL NARROW BAND FILTERS
Carl R. Hurtig, Greenbush, and Austen Madeson, Newton, Mass., assignors to Damon Engineering, Inc., Needham Heights, Mass., a corporation of Delaware
Filed Apr. 6, 1966, Ser. No. 540,764
Int. Cl. G01r 23/18
U.S. Cl. 324—77
6 Claims

ABSTRACT OF THE DISCLOSURE

This invention relates to a spectrum analyzer for analyzing the spectrum of an electrical signal of bandwidth R. A band of narrow band filters having non-contiguous pass bands are provided. The pass bands of each of these narrow band filters are located in a portion of a sub-band of the total bandwidth to be analyzed. The incoming signal is mixed with the signal from an oscillator whose frequency is swept linearly and the inner output is supplied to each of the filters. This effectively simultaneously sweeps the pass bands of each of the narrow band filters over the sub-band in which it is located. The output from each of the filters is detected and displayed in such a fashion that a spectral analysis over the entire bandwidth is displayed.

---

This invention deals with the analysis of waves to extract or otherwise determine their frequency spectra. Its object is to effect coordinated economies in the apparatus and in the elasped time required for such determination.

The best known approaches to spectrum analysis are two, and these may be termed the parallel or simultaneous approach and the seriatim approach, respectively. According to the first approach, a number or "bank" of filters are provided, having contiguous passbands which together embrace the entire frequency band of the wave to be analyzed, or at least such part of it as is of interest. The wave to be analyzed is applied simultaneously to all of these filters together. The energy passing through each filter is measured by detection and the several filter outputs are displayed on a frequency axis, usually through the agency of a commutator. For high resolution, the passbands of the filters must be narrow, and hence the number of filters required is large. Filters in such large numbers, each differing in the magnitudes of its elements from all the others are very costly. Aside from apparatus cost, this approach is open to the objection that any frequency component of an arbitrary incoming wave may lie, not neatly centered in a single filter passband but, instead, at or near to the crossover frequency of two adjacent filter passbands, in which case the apparatus gives a false indication: it indicates the presence of weak components at two adjacent frequencies instead of a single stronger component at an intermediate frequency. On the other hand, such apparatus is fast: because all the filters work simultaneously and together, the time required for the entire operation is no greater than the time required to determine the presence of a single component. Aside from refinements not presently of interest, this time is equal to the reciprocal of the resolution bandwidth of a single one of the filters of the group.

According to the second approach, a local "carrier" oscillator is provided of which the frequency is swept, usually by a control signal of sawtooth form, through a range equal to the frequency band of the incoming wave. With the aid of a modulator or mixer, the output of this oscillator is modulated with the several frequency components of the incoming wave. The sweep of the oscillator frequency causes the full set of these modulation products to sweep through a frequency range equal to that of the signal band. In so doing they pass, one after the other, across the passband of a single filter, of which the output indicates their energies, one by one, and hence the energies of the components of the incoming wave.

Such a system is fully equivalent to one in which a single tunable filter having a passband of invariant width is swept over the original frequency band of interest. It is sometimes convenient to envision the equavalent instead of the reality.

Because the output of the single filter represents the components sought in sequence and in order, commutation is not required. Because each component, in turn, is effectively swept over the filter passband, it always appears, at least for a brief time, within this band. Consequently the "cross-over ambiguity" that characterizes the first approach does not exist.

The apparatus is far less costly than the multiple filter apparatus of the first approach. On the other hand, because the single filter is required to pick out the several components one by one, the analysis time, for the same degree of resolution, is equal to the product of the time required for indicating the presence of a single component by the number of components so indicated. For some purposes the resulting delays are intolerable. Of course, the analysis may be speeded up by resort to an analyzing filter of broader passband; but the price of speed is in this case a reduction of resolution, and this may be as objectionable as the long analysis time which it eliminates.

The present invention stems from the realization that, while an analysis carried out by the second approach may be intolerably slow, the rapidity of one carried out by the first approach may be of no practical importance. Such analyses are needed when they are required, and not before. Any speed that is greater than the required speed makes for apparatus cost and serves no purpose.

The invention, therefore, establishes a compromise between incompatible considerations. Like the first approach, it utilizes a number of filters. But unlike it, they are fewer in number than those of the first approach and their passbands are not contiguous. To the contrary, the passband of each filter occupies only a fraction of one of a plurality of contiguous sub-bands which together embrace a frequency range equal to but displaced from that of the wave to be analyzed, the remainder of the sub-band being, in each case, empty. Like the second approach, a sweep frequency oscillator and a modulator act in concert to develop a set of modulation products, one for each component of the incoming wave, and these are swept along the frequency scale. But unlike the second approach the sweep extends, not over a frequency range equal to that of the incoming wave, but only over a single one of the contiguous sub-bands. Hence one group of adjacent components are swept across the passband of one filter, the next group across the passband of the next filter, and so on. Thus, as compared with the first approach, the cost of the apparatus is reduced in proportion to the reduction in the number of filters while, as compared with the second approach, analysis time is reduced in proportion to the reduction of the extent of the frequency sweep. Moreover, because each component is swept through the passband of one or other of the filters, the avoidance of the crossover ambiguity, secured with the second approach, is preserved.

The time for the analysis of an incoming wave and the degree of resolution required depend on the use to which the results of the analysis are to be put and on the characteristics of the wave: the extent to which it is periodic or transient, and so on. In general, such characteristics are known beforehand, at least to some extent and approximately. Therefore, once the designer has reached his decision as to the requirements of resolution and analysis time which must be met, the number of sub-bands into which the wave band is to be divided, and hence the number of filters required for the practice of the invention, are uniquely determined. Thus the compromise offered by the invention is, for each particular case, an optimum one.

The practice of the invention presents an ancillary problem in connection with the display, for visual observation, of the extracted spectrum. For, if known techniques are employed without change, the advantages offered by the invention can be lost. Thus, if it is attempted to develop and display the several components extracted by the several filters one by one in numerical order, a significant component within the passband of one of the filters may have come and gone while the output of another filter is being examined and before the turn of the one filter comes. Various expedients are available for solving this ancillary problem. Some of them are discussed in the description which follows. One of the simplest is to provide a bank of independent cathode ray oscilloscopes, arranged side by side, to sweep the beams of all of them synchronously in the horizontal dimension, and to deflect the beam of each oscilloscope in the vertical dimension under control of the detected output of the corresponding one of the analyzing filters.

The invention will be fully apprehended from the following detailed description of an illustrative embodiment thereof taken in connection with the appended drawings in which.

Figure 1:
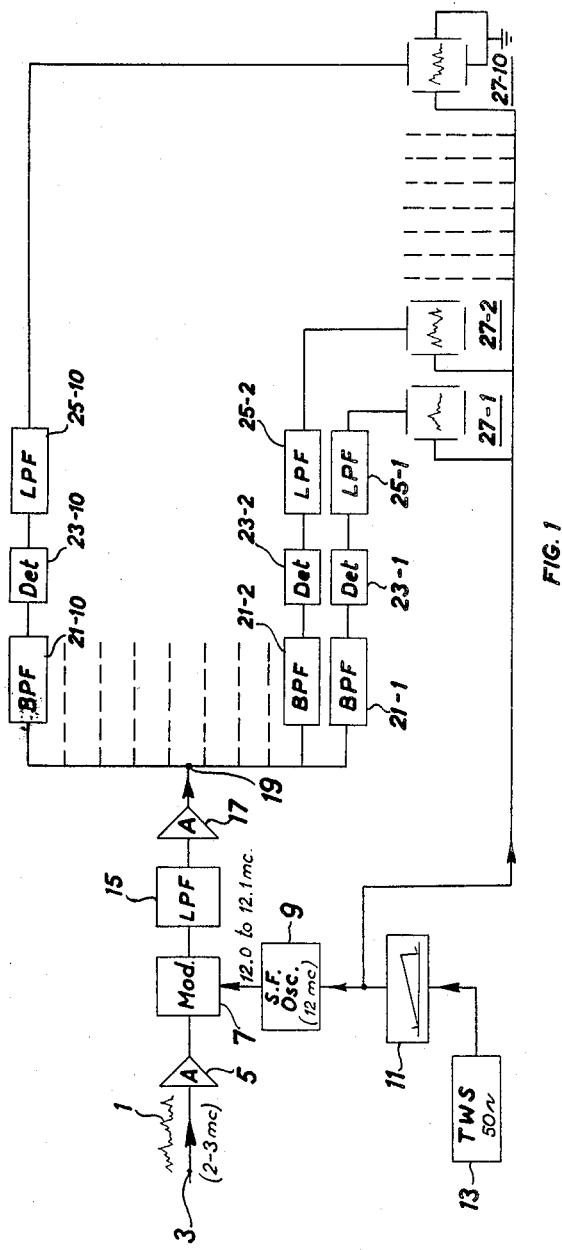
FIG. 1 is a block schematic diagram of apparatus embodying the invention.

Referring now to the drawings, a wave 1 to be analyzed appears at an input terminal 3. Illustratively, the lowest component frequency of interest may be two megacycles per second and the highest three megacycles per second. Thus the band of interest occupies a range of one megacycle per second.

The incoming wave 1, after being brought to an amplitude appropriate for further processing as by an amplifier 5, is applied to one input point of a modulator 7. The other input point of the modulator 7 is supplied with the output of a sweep frequency "carrier" oscillator 9. Aside from alterations of its frequency, to be described below, the frequency of this oscillator 9 must be high compared with the highest component frequency of interest. For the wave illustrated, a frequency of 12 megacycles per second is suitable. This frequency is repeatedly swept over a suitable range, much narrower than the full range of interest, by the output of a sawtooth wave oscillator 11 which is in turn controlled by a timing wave source 13 of a frequency that is high compared with the flicker perception rate of the human eye. A frequency of 50 cycles per second is suitable.

The output of the modulator 7 with the inputs described above, consists of two modulation products for each component frequency of the incoming wave, namely, an upper modulation product of which the frequency is the sum of the local oscillator frequency and that of a wave component and a lower modulation product whose frequency is the difference between the two. Either the upper modulation products or the lower ones may be employed. Illustratively, the lower ones are employed in this embodiment. Accordingly, the entire output of the modulator 7 is applied to a lowpass filter 15 proportioned to block components of the 12 megacycle carrier frequency and higher, and to pass all the lower order modulation products of interest. These extend from nine megacycles per second, corresponding to the upper end of the wave band, to ten megacycles per second corresponding to the lower end of the wave band.

This set of modulation products, after being adjusted in amplitude to a level suitable for further processing by an amplifier 17 are applied to a terminal 19 that is common to the input points of a set of bandpass filters 21. Of these the first two and the last are shown, the remaining ones being merely indicated.

It is instructive to compare the apparatus with known analyzers of the first and second forms described above and having the same amount of resolution in the frequency domain. The degree of resolution obtainable is determined by the resolution bandwidths of the several filters. For a typical case of practical interest it may be required to determine the location, on the frequency scale, of each component of the incoming wave with an accuracy of one part in 200. Thus the first approach calls for a bank of 200 filters having contiguous passbands which together embrace the full range of one megacycle per second. Accordingly, the resolution passband of each filter is 5 kilocycles per second, and the time required for the analysis is the reciprocal of this, namely $2/10$ millisecond.

Let it be supposed that, in particular circumstances this high speed is unnecessary and that an analysis time of 4 milliseconds would serve equally well for practical purposes, while 40 milliseconds would be unacceptable. Accordingly, the invention provides a group, not of 200 filters, but of the 10 filters 21, each having a resolution band of 5 kilocycles per second. Their passbands are thus by no means contiguous. To the contrary, each one occupies approximately one twentieth of the frequency space to which it is assigned; i.e. one twentieth of a single one of a group of contiguous sub-bands which together cover the range of interest.

Figure 2:
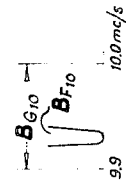
FIG. 2 is a chart illustrating the distribution of the passbands of the filters of FIG. 1 in relation to the effective frequency band of the wave to be analyzed.

This disposition of the resolution passbands in frequency space is illustrated in FIG. 2, wherein the passband $B_{F1}$ is that of the first filter 21–1 which is assigned to a subband $B_{G1}$, twenty times as wide as the filter passband. The same holds for each of the ten filters 21 and ten subbands $B_{G1}$–$B_{G10}$ of the set. Thus the ten subbands $B_G$ are contiguous and together embrace the entire modulation product band which extends from nine megacycles to ten megacycles while the actual passband $B_F$ of each filter 21 occupies only a fraction of the subband to which it is assigned.

As the frequency of the carrier oscillator 9 is swept through a selected range under control of the sawtooth oscillator 11, all of the modulation products are similarly swept through the same range. In contrast to analysis according to the second approach described above, this sweep extends only through a single one of the subbands $B_G$. That is to say the frequency sweep is restricted to 100 kilocycles per second instead of one megacycle per second; i.e. one-tenth of the sweep range required by the second approach. Thus, for example, the modulation products which are representative of the highest group of components of the incoming wave are swept through the first subband, from 9.0 megacycles to 9.1 megacycles. Similarly the modulation products representative of the next lower group of components of the incoming wave are swept from 9.1 megacycles to 9.2 megacycles. So on through the full set of subbands $B_G$, the modulation products representative of the lowest group of components of the incoming wave being swept from 9.9 megacycles per second to 10 megacycles per second.

With this arrangement each modulation product passes, in the course of its sweep, through the resolution band $B_F$ of one or other of the filters 21. There being ten such bands and ten such filters and the extent of the sweep being but one-tenth of that required for the second approach, the total analysis time is only one-tenth of what is required, for the same degree of resolution, with the second approach.

The energies passing through the several analyzing filters 21 are determined by detectors 23, one for each of the filters 21 and the several detectors 23 are followed by low pass rejection filters 25 proportioned to exclude spurious frequency components such, for example, as incidental modulation products which may result from the detection process, while passing the components of interest, i.e., those recovered by the analyzing filters. Cutoff frequencies of the order of 5 kilocycles per second are suitable for these rejection filters 25.

Bandpass filters are of many kinds and have various attenuation and phase characteristics. The choice of filter-type employed for the analyzing filters 21 therefore depends on many factors. If, for example, minimization of analysis time, for a fixed number of filters and a required degree of resolution, is the prime consideration, Gaussian filters are more suitable than filters of other types.

Figure 3:
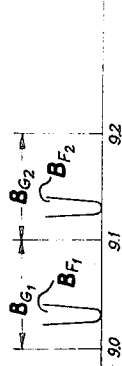
FIG. 3 is a representation of the faces of a bank of cathode beam tubes which together display the entire extracted spectrum.
Figure 3:
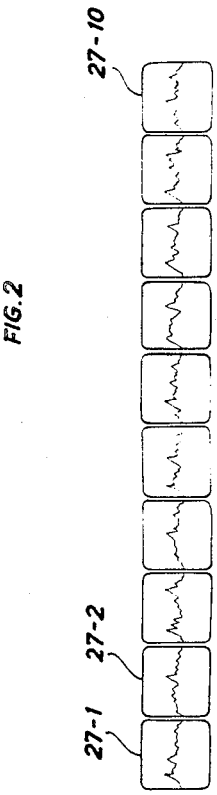

The energies appearing at the output points of the several rejection filters 25 are now representative of the several frequency components of the incoming wave 1. It remains only to put them to use; illustratively, to display them on a frequency scale. For this purpose a group of small cathode beam tubes 27 or oscilloscopes are provided, preferably of the type having rectangular end faces, and these are arranged side by side in a row as shown in FIG. 3. Each one is provided with its own electron gun, accelerating electrodes and deflecting electrodes. As shown in the lower portion of FIG. 1, the horizontal deflecting elements of these several tubes are connected in parallel and to the output point of the sawtooth wave oscillator 11. This causes the beams of the several tubes to sweep horizontally across the tube end faces in synchronism with the sweep of the frequency of the carrier oscillator 9 and hence in synchronism with the effective sweeps of the passbands $B_F$ of the analyzing filters 21 across the several subbands $B_G$ to which they are assigned.

The output points of the several low pass filters 25 are directly connected to the vertical beam deflecting elements of the several tubes 27, one to each. This causes their beams to be deflected vertically in proportion to the detected energies of the several analyzing channels.

The rectangular end face of each of these tubes 27 may be provided with a frequency scale which extends across its full width. Thus the tubes of the array, taken together, bear a frequency scale which extends from the lefthand margin of the face of the first tube to the righthand margin of the face of the last and contains only narrow gaps necessitated by the thicknesses of the sidewalls of the tubes. These narrow gaps in the frequency scale cause no difficulty in close observation and evaluation of the displayed spectrum.

If preferred, the bank of individual cathode beam tubes may be replaced by a single tube provided with an appropriate number, in this case ten, of independent electron guns, each with its own accelerating and deflecting elements. This alternative operates in the same way as the one shown, the difference being only that the several guns and deflecting elements share a single phosphorescent tube face in common. Hence, the frequency scale has no gaps.

Similar techniques can be employed to display the information on hard copy through the agency of writing styli and a mechanism for governing their movements. Hard copy machines are presently available which are provided with a single writing stylus which is moved across the full width of a sheet of electrosensitive paper while the intensity of an electric current supplied to the stylus and by which it writes on the paper is modulated under control of an input signal. A straightforward modification of such a machine provides for simultaneous movement of several such styli, the intensities of the currents supplied to them being independently controlled by the outputs of the several analyzing channels.

If for any reason it is imperative to present the display with the aid of a single cathode beam tube having a single gun and a single set of accelerating and deflecting elements, this too can be accomplished by a suitable scanning program, for example, one similar to that described in Becker Patent 2,878,310.

In brief, such a program calls for laying down the various information items, in this case the energies of the spectral components, in a temporal order which differs from their numerical order such that, once they are all laid down, they appear in a spatial order that is identical with their numerical order. This may be termed an "interlaced" display. In the present case, to avoid possible loss of a transient component that may appear in the output of one filter while the output of another filter is being examined, the output energies of the several analyzing channels should be sampled in immediate and rapid succession, first for the initial effective locations of the filters on the frequency scale, then for their next ensuing locations, and so on for all such locations. Advantageously, two successive samples are taken of the energy of each channel at each location. Meanwhile, the single beam of the cathode ray tube may be caused to advance from side to side of the tube face in abrupt, discrete jumps, each of a magnitude coordinated with the width of one of the contiguous subbands. Thus, for the sake of explanation, suppose that, in a very simple system, three effectively swept filters are provided to replace twelve fixed filters of the first approach. Then, the cathode beam is first turned on at the lefthand margin of the tube face to display the energy of the first filter in its first location on the frequency scale. Next, it jumps immediately to the center of the tube face to display the energy of the second filter in its first location; then again to the right of the center of the tube face to display the energy of the third filter in its first location. It then flies back to a point slightly to the right of its starting point to display the energy of the first filter which is now in its second location; then to the right of the second point for the energy of the second filter in its second location; then to the right of the third point for the energy of the third filter in its second location. It then flies back to a point somewhat to the right of the fourth point, to display the energy of the first filter in its third frequency location, and so on. This sweeping program can be accomplished through the additive combination of a sawtooth wave and a staircase wave. The staircase wave, in the simple example described above, has three treads. In a system arranged to display the information developed by the analyzer described above, the staircase has ten treads. Each of these treads is responsible for the abrupt movement of the cathode beam from one point of the tube face to another point. Simultaneously the sawtooth wave on which the staircase wave is mounted is responsible for the gradual displacement of the several steps of the beam movement from one margin of the tube face toward the other.

The system last described offers the advantage that the input points of the several analyzing channels can be connected to the several "segments" of a "commutator" of which the common output point is connected to the single vertical deflecting element of the tube. The terms "commutator" and "segment" are employed merely for simplicity of description. As a practical matter, electronic commutation would normally be employed instead of mechanical.

Various modifications of the apparatus described above, as well as uses, other than the display of spectra, to which the analyzing apparatus can be put, will suggest themselves to those versed in the art.

The invention having now been described, what is claimed is:

1. Apparatus for extracting from an incoming wave the components of its frequency spectrum, said spectrum extending over a frequency range of width R, which comprises
   a number N of analyzing filters, said analyzing filters having discontiguous pass bands, each of said filter pass bands being located within one of a like number of contiguous sub-bands, each of said sub-bands having a width $R/N$,
   which together embrace the range R,
   means for effectively applying said wave simultaneously to all of said filters, means for simultaneously effectively sweeping the pass band of each filter from side to side of the sub-band in which it is located, means for continuously determining the output energies of the several filters in the course of their sweeps, and means for utilizing said determined energies.

2. Apparatus as defined in claim 1 wherein said utilizing means comprises means for displaying said determined energies in numerical order of their frequencies.

3. Apparatus as defined in claim 1 wherein the frequency range embraced by said contiguous subbands is displaced on the frequency scale from the band occupied by said incoming wave by an amount such as to accept modulation products of the components of said wave with a carrier frequency and wherein said effective sweeping means comprises a tunable oscillator proportioned to deliver a signal of said carrier frequency, means for heterodyning said signal with said incoming wave to develop, for each spectral component of said wave, a modulation product, means for applying said modulation products to all of said filters, and means for sweeping said oscillator frequency through the range $R/N$ embraced by a single one of said subbands.

4. Apparatus as defined in claim 1 wherein the attenuation-frequency characteristic of each of said analyzing filters approximates a curve of Gaussian form.

5. In combination with apparatus as defined in claim 3 wherein said carrier signal is of frequency $f_s$ and a component of said incoming wave is of frequency $f_c$ and wherein, for each component frequency $f_c$, two modulation products are developed, of frequencies $f_s+f_c$ and $f_s-f_c$, respectively, means for selecting one set of said modulation products and for discarding the other set, and means for applying said selected set of modulation products to all of said filters while excluding said discarded set from said filters.

6. Apparatus for extracting from an incoming wave of bandwidth $R=f_2-f_1$ the components of its spectrum which comprises a number N of filters having discontiguous passbands, each occupying only a fraction of one of a number N of contiguous subbands which together embrace a band width R, displaced on the frequency scale from said wave band, heterodyne means including an oscillator and a modulator for developing from each spectral component of the incoming wave a modulation product of strength representative of the strength of said component and of frequency such as to fall within one of said subbands, means for sweeping the frequency of said oscillator through a range $R/N$, thus to cause each modulation product to shift simultaneously in frequency through a range $R/N$ and, in so doing, to fall briefly in the passband of a single one of said filters, and means for indicating the energies passing through the several filters.

References Cited

UNITED STATES PATENTS

| | | |
|---|---|---|
| 2,159,790 | 5/1939 | Freystedt et al. |
| 2,525,679 | 10/1950 | Hurvitz. |
| 2,897,442 | 7/1959 | Wright et al. |
| 2,967,274 | 1/1961 | Hurvitz. |
| 3,243,703 | 3/1966 | Wood. |

RUDOLPH V. ROLINEC, Primary Examiner

P. F. WILLE, Assistant Examiner

U.S. Cl. X.R.

179—1